United States Patent Office 3,304,025
Patented Feb. 14, 1967

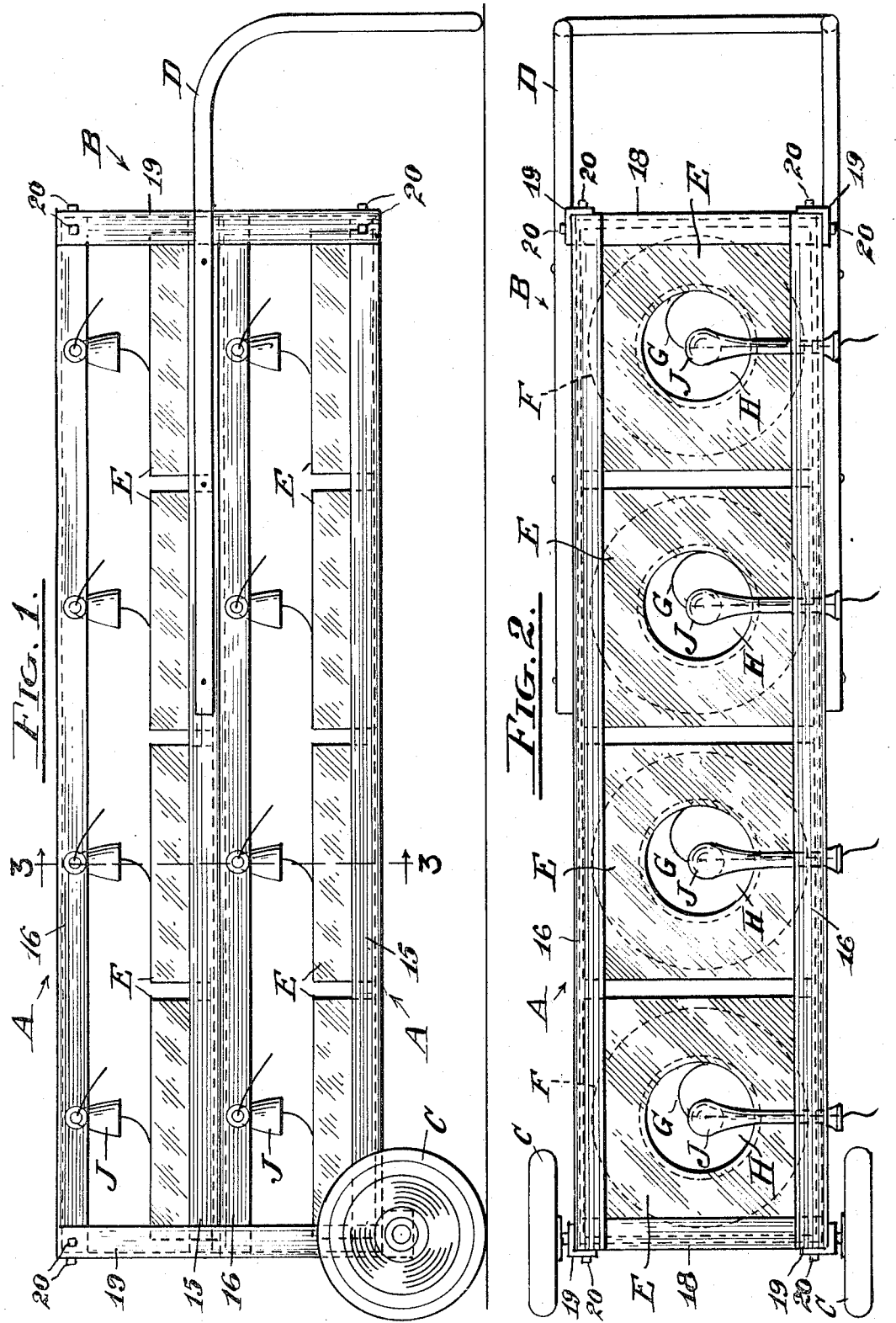

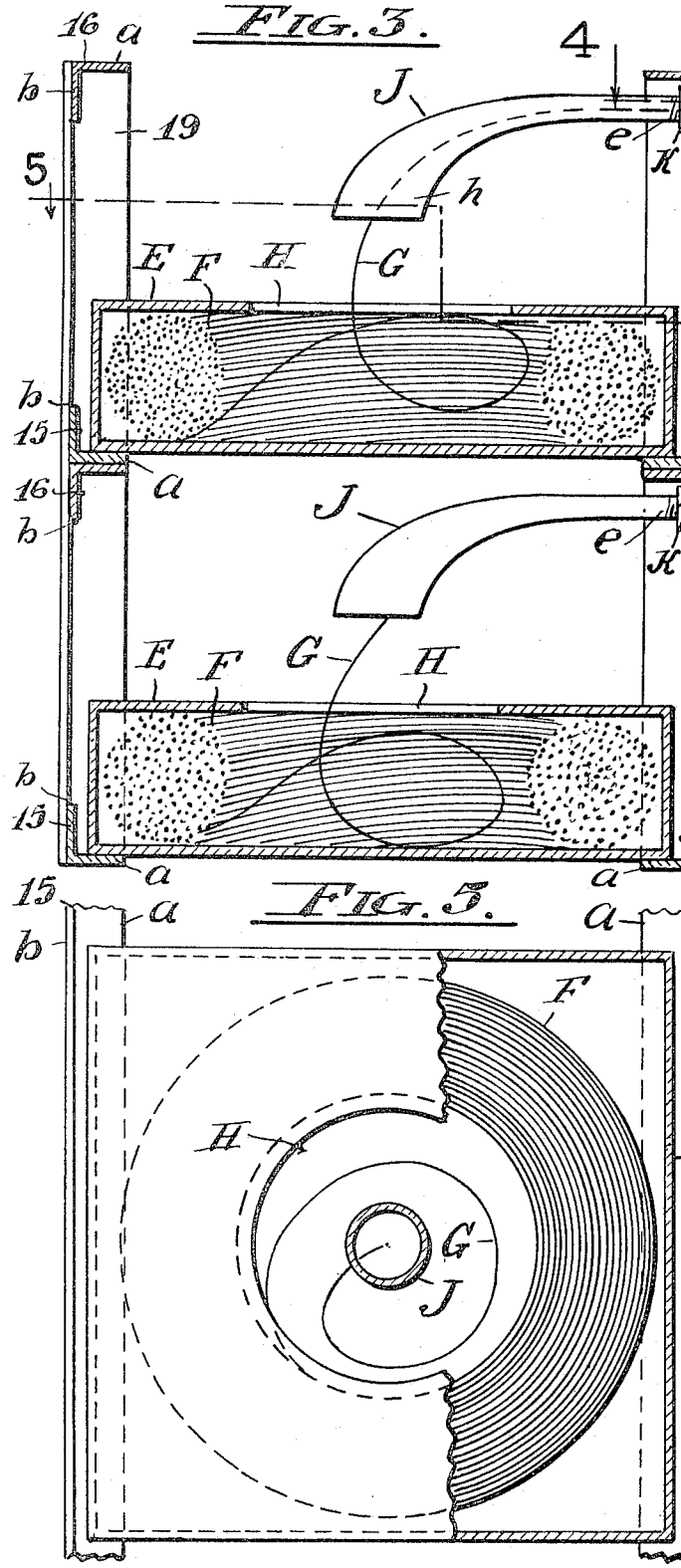
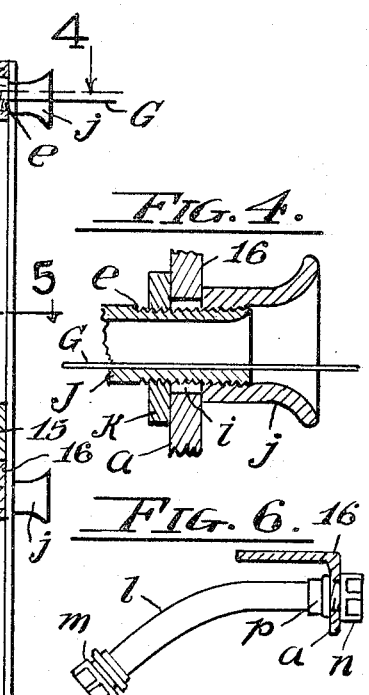
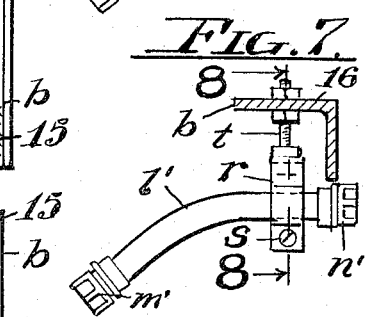
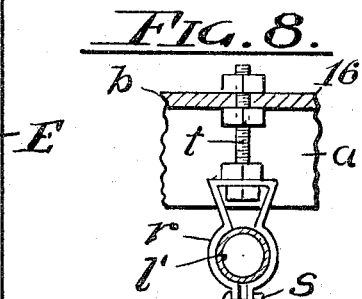

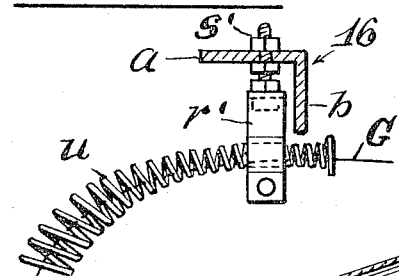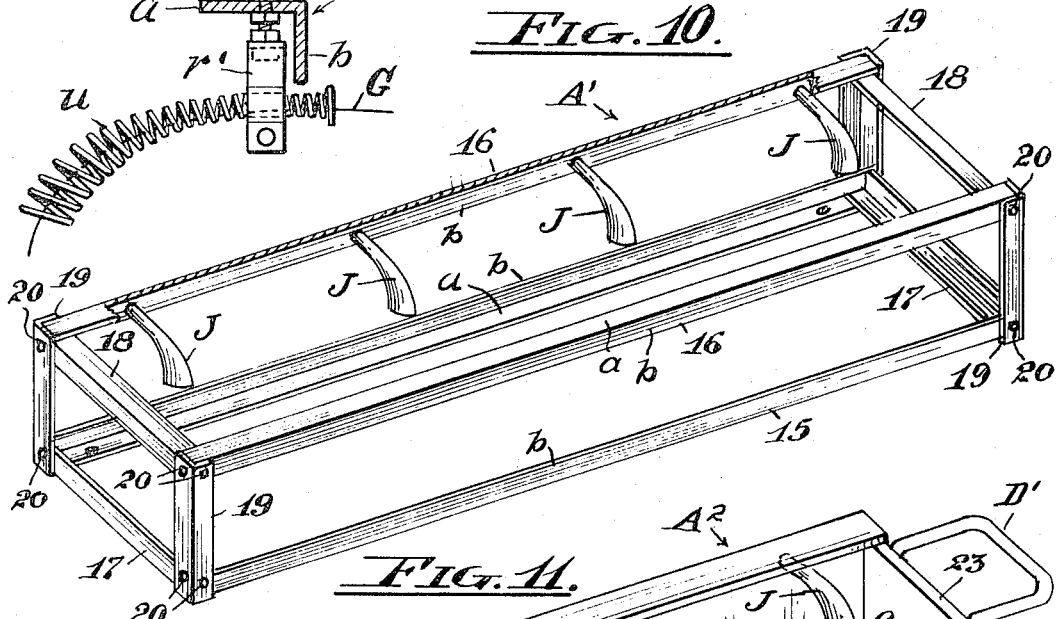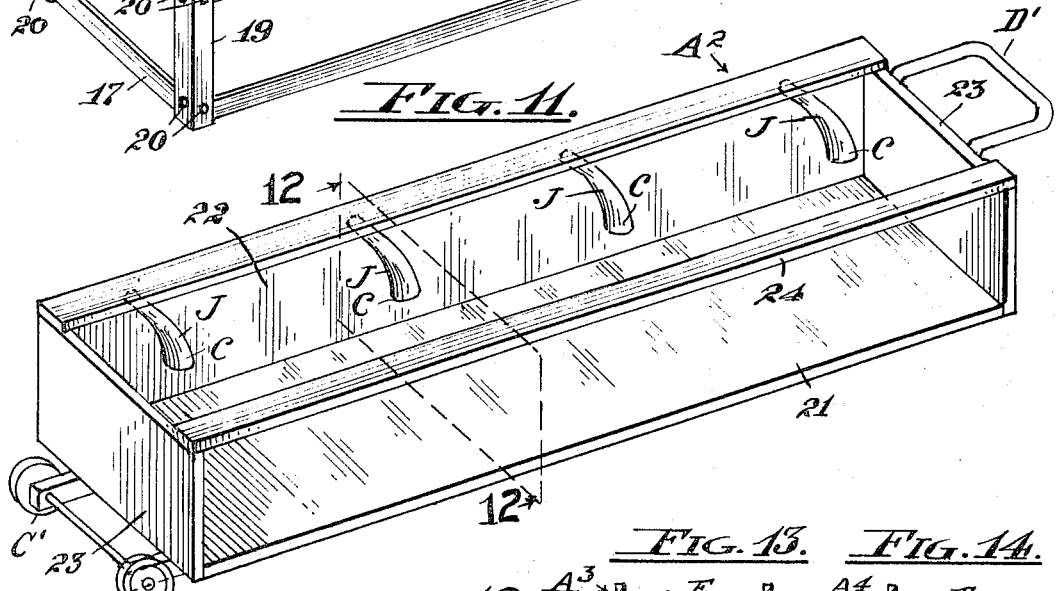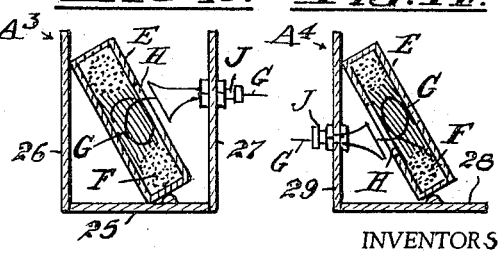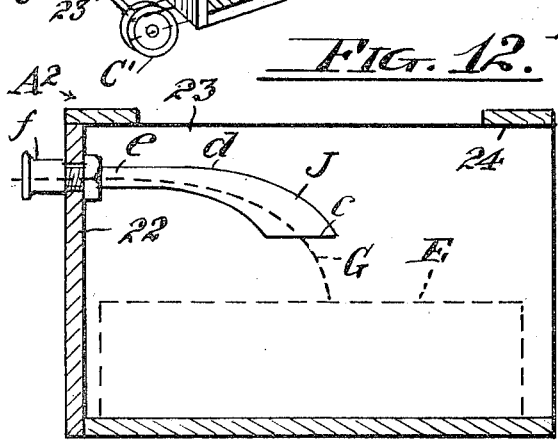

3,304,025
RACK FOR BOXED COILED WIRE
Leon Zerg, Venice, Calif. (8583 Venice Blvd., Los Angeles, Calif. 90034), and Jack Webster, Venice, Calif.; said Webster assignor to said Zerg
Filed Aug. 17, 1965, Ser. No. 480,408
4 Claims. (Cl. 242—129)

Insulated wires employed as electric current conductors are generally supplied spirally wound in loose coils housed in rectangular six-sided boxes formed of corrugated paper. Such boxes are usually provided with circular markings on a side thereof substantially opposite the inner periphery of the wire coil housed therein along which the side of the box is severed to provide a circular opening giving access to the boxed coil and through which a length of the wire is delivered on its being unwound from the inner periphery of the coil.

These boxes of wire are initially quite heavy and accordingly considerable effort and inconvenience is occasioned in moving them about, as is necessitated when unwinding the wire therefrom in performing an electric wiring operation, especially where a plurality of boxes of wire are employed at a time, as where a number of different sized wires are being used on a job with each size of wire wound in a coil within an individual box.

The present invention relates to and has as its primary object the provision of a rack for mounting boxed wire coils whereby one or more of such boxes may be readily supported and then moved from place to place with the box or boxes positioned so as to facilitate unwinding of the coils thereof by imposing a pull on the length of wire protruding through an opening in the upper side of the box.

Another object of the invention is to provide a rack for the purpose specified which may be embodied in a hand-truck with a multiple of boxed wire coils arranged in a row when the truck is at rest, and whereby a multiple of the racks may be arranged one above another in the truck structure to thereby provide a conveyor affording mountings for a plurality of superimposed rows of the wire-containing boxes.

A particular object of the invention is to provide a rack for supporting boxed wire coils wherein the rack embodies a wire guideway leading from opposite the discharge opening in each wire containing box supported on the rack, whereby the wire being drawn from the boxed coil will be directed laterally outward from a horizontally seated box on the rack in such fashion that the wire will pass through the discharge opening without engaging the margin of the box surrounding such opening thereby insuring against the advancing length of wire slicing into such margin and becoming anchored therein.

With the foregoing objects in view together with other objects and advantages hereinafter set forth, the invention resides in the parts and in the combination, construction and arrangement of parts hereinafter described and claimed and illustrated by way of example in the accompanying drawings, in which:

FIG. 1 is a view in side elevation of a hand-truck embodying a pair of superimposed racks each carrying a row of coiled wire-containing boxes;

FIG. 2 is a plan view of the structure shown in FIG. 1;

FIG. 3 is an enlarged view in cross section, partly in elevation as seen on the line 3—3 of FIG. 1;

FIG. 4 is a detail in section as seen on the line 4—4 of FIG. 3 showing a preferred form of the wire guideway;

FIG. 5 is an enlarged plan view partly in horizontal section taken on the line 5—5 of FIG. 3;

FIG. 6 is a detail in section and elevation of a modified form of the wire guide-way showing it as rigidly mounted on the coil supporting rack;

FIG. 7 is a view in side elevation of the wire guideway showing it as pivotally mounted;

FIG. 8 is a view in section and elevation taken on the line 8—8 of FIG. 7;

FIG. 9 is a side view of another form of the wire guide-way;

FIG. 10 is an isometric view of a supplemental rack for application to the structure of FIGS. 1, 2, 3, to increase the capacity thereof;

FIG. 11 is an isometric view of a modified form of the invention;

FIG. 12 is an enlarged section and elevation as seen on the line 12—12 of FIG. 11; and FIGS. 13 and 14 are views in cross section depicting modifications of the rack structure and the arrangement of the boxed coils therein and the positioning of the wire guide-ways on the racks.

Referring to the drawings more specifically an elongate wire coil-supporting rack is indicated generally at A in FIGS. 1 and 3 in which a pair of such racks is shown as superimposed in a single structure constituting a conveyor or hand-truck B; the assembly being equipped with supporting rollers C—C at one end thereof and having a handle-bar D at its other end. The rollers and handle-bar may be of any suitable construction. An auxiliary rack A' complementary to the racks A is shown in FIG. 10, one or more of which may be added to the conveyor B to increase the capacity thereof.

The racks are subject to varied constructions, being shown in FIGS. 1 and 10 at A and A' respectively as comprising open framework, in FIGS. 11–12 at A², and in FIGS. 13–14 at A³ and A⁴ as formed of paneled walls.

The racks A–A', A², A³ and A⁴ constitute mountings for rectangular boxes E containing coils F of wire G, each rack being adapted to receive and support a single row of the boxes E with adjacent boxes contiguous each other. A form of the rack wherein the boxed wire coils F are positioned horizontally is indicated at A–A'–A² and modifications are designated at A³ and A⁴ in FIGS. 13 and 14 wherein the box E containing a wire coil F is positioned other than horizontally and a wire guideway J disposed accordingly.

Each of the racks A–A' embodies a pair of spaced parallel elongate bottom side rails 15—15 for supporting the boxes E, as particularly shown in FIG. 3, and also embodies a pair of spaced parallel top side rails 16—16, spaced above and paralleling the bottom rails 15—15 in alignment therewith, one of which rails 16 serves as a support for wire guide-ways J as will presently be described.

The bottom side rails 15—15 are connected together at their ends by end-rails 17—17 and the top side-rails 16—16 are connected together at their ends by end-rails 18—18, while the ends of the intersecting side and end rails 15-17 and 16-18 are inter-connected by corner-posts 19 which are detachably joined at their ends to the adjacent side and end rails by bolt and nut assemblies 20 in a conventional manner whereby the racks A–A' may be shipped and marketed in knock-down disassembled condition for subsequent assemblage.

Each of the boxes E is six-sided, formed of corrugated paper and provided with a central circular discharge opening H on its upper side through which the wire G is delivered to discharge by unwinding it from the inner periphery of the coil F effected by imparting a pull on a leading length of the wire.

The side rails 15—15 16—16, end rails 17—17 18—18, and corner posts 19 consist of lengths of metallic anglebars, of right-angle cross section and comprising webs *a* and *b*. The bottom side rails 15—15 are arranged with the web *a* thereof extending horizontally and presented inwardly to form seats for the boxes E with the other web *b* thereof extending vertically along the outer margin of the rail to form upstanding walls adjacent the boxes E to confine the latter and limit lateral movement thereof transversely of the rack. The webs *a* of the top rails 16—16 extend inwardly while the webs *b* thereof project downwardly along their outer margins with the webs *b* of one of the rails 16 constituting a side wall serving in some instances as a mounting for the wire guide-ways J as particularly shown in FIG. 4.

The corner posts 19 are arranged with the inner sides of their angular webs *a–b* positioned astride the overlying abutting ends of the side and end rails with a bolt and nut assembly 20 joining one of the webs of the post to the vertical webs *b* of the side rails and with a bolt and nut assembly 20 joining the other web of the post to the vertical web *b* of the end rails 17–18.

Where two or more of the racks A are arranged one above another the corner posts 19 of the adjacent racks may be unitary as shown in FIG. 1.

In the modified form of the invention shown in FIGS. 11–12, the rack A² embodies an elongate rectangular bottom panel 21, a side panel 22 and end panels 23—23, and a tie-strip 24 connecting the upper outer marginal portions of the end panels; the rack being otherwise open at its top and throughout the front thereof. The bottom panel 21 affords a support for a row of the coil-containing boxes E and the back panel 22 serves as a mounting for the wire guide-ways J as indicated in FIG. 12.

The box like rack A² may be equipped with rollers C'—C' at one end thereof and with a handle bar D' at its other end as indicated in FIG. 11 and a plurality of the racks A² may be arranged one above another to provide a multiple of superimposed racks in the fashion illustrated in FIG. 3.

In the above described racks A–A'–A² the boxes E and coils F therein are arranged horizontally and the guide-ways J are formed to direct the discharging wire G upwardly and laterally outward. However such arrangements are subject to variation as illustrated for example in FIGS. 13–14, wherein the racks A³–A⁴ are designed to hold the box E and its enclosed coil F in an inclined position.

In the structure shown in FIG. 13 the rack A³ embodies a bottom wall 25, a back wall 26, and a front wall 27 and is open at its top. The box E is seated at an inclination on the bottom wall 25 and rested against the back wall 26 with its discharge opening H uppermost. The guide-way J comprises a straight open ended tube extended through the wall 27 and having a flared entrant inner end opening opposite the delivery opening H of the box E to receive the wire G. In this instance the boxes E are positioned in the rack A³ and removed therefrom through the open upper side thereof.

In the structure shown in FIG. 14, the rack A⁴ embodies a bottom wall 28 and a back wall 29 and is open at its front and top. The box E is seated at an inclination on the bottom wall 28 and rested against the back wall 29 in an inverted position to present the delivery opening toward the back wall 29. The guide-way J extends through the back wall 29 in fixed engagement therewith and has a flared inner end presented to the delivery opening of the box proximate thereto for the reception of the wire G which is drawn through the guide-way as will now be described.

The guide-ways J are designed to direct lengths of the wire G from the coils F in the boxes E mounted in the racks A–A'–A²–A³–A⁴ with the wire delivered through the discharge openings H free of the box tops and yet be directed laterally outward from a side of the rack on a pull being imparted to the wire of sufficient force to uncoil the wire from the inner perimeter of the coil. To accomplish this purpose the guide-way comprises an elongate open ended tubular structure carried on the upper portion of the rack with the entrant end *c* of the guide-way presented toward the center of the opening H and preferably spaced from the box E; the guide-way being bent intermediate its ends if need be as indicated at *d* to present its outer discharge end portion *e* in angular relation to its inner end with its open outer end *f* disposed in outward lateral spaced relation to the contiguous side of the rack.

In the preferred form of the guide-way shown in FIGS. 1, 2, 3, 4 and 11–12 the entrant inner open end portion thereof is flared outwardly, as indicated at *h* and its outer end portion *e* is externally threaded, is passed through an opening *i* or *i'* in the side wall *a* or 22 respectively of the rack, and has an outwardly flared annulus *j* screwed on its outer end, in abutting relation to the rack wall *a* or 22. A clamp nut *k* is screwed on the threaded end portion *e* of the guide-way interiorly of the rack and bears against the wall *a* or 22 in opposition to the annulus *j* to fixedly yet removably clamp the guide-way in position on the rack, as particularly shown in FIG. 4.

However, the guide-ways may be constructed and mounted variously as occasion may require as illustrated, for example, in FIGS. 6, 7, 8 and 9. In the construction shown in FIG. 6, the guide-way comprises an open ended length of tubing *l* of uniform diameter with annular caps *m–n* screwed on the inner and outer ends thereof; the outer end of the tubing being passed through the flange *a* of the rail 16 and having a ring-nut *p* screwed on its outer end portion to abut the rail 16 in opposition to the cap *n* to thereby rigidly clamp the guide-way in position on the rack against lateral movement.

In the construction shown in FIGS. 7–8 the guide-way comprises a length of tubing *l'* like that shown in FIG. 6, fitted with annular end caps *m'–n'*, but in this instance the guide-way is pivotally attached to the rail 16 for lateral swinging movement or adjustment. The mounting of this guide-way comprises a yoke *r* which is clamped around the tubing *l'* by a bolt and nut assembly *s*, as particularly shown in FIG. 8 and which yoke is pivoted on a bolt *t* suspended from the web *b* of the rail 16 as indicated.

In the construction shown in FIG. 9, the guide-way comprises a length of spirally wound wire *u* constituting an open ended tube similar to that shown in FIG. 4, which structure may be mounted on the rack in any suitable manner with one end thereof presented downward and its other end directed horizontally away from one side of the rack. As here shown this guide-way is clamped in a yoke *r'* attached to the rail 16 by a bolt and nut assembly *s'*. The wire G to be guided is passed longitudinally through the tube formed by the convolutions of the spirally wound wire *u*.

In any event, the guide-ways J are independent of the boxes E and have their entrant ends *c* spaced from the box-supporting means so that the boxes may be readily passed between the guide-ways and supporting means in effecting their mounting on the rack and their removal therefrom.

In order to facilitate delivery of the wire G from the coil F into the mouth of the guide-way without draging on the portion of the box E forming the margin of the opening H, advantage is taken of the fact that the wire G is wound in the coil F in loose spirals or convolutions and because of the insulated wire being resistant to bending and thereby having an inherent tendancy to retain its spiral formation a pull of sufficient force on the inner end portion of the coiled wire will cause one or more of the initial inner convolutions of the wire to contract and move away from the main body of the coil so that the wire will unwind from the inner periphery of the coil in loose spirals as indicated in FIGS. 3 and 5. The unwinding wire tends to follow the direction of the pull imparted thereon which, by reason of the guide-way leading from opposite the discharge opening, through which the wire is directed, is outwardly substantially centrally of the discharge opening approximately as shown, thus maintaining the discharging length of wire clear of the box.

In the operation of the invention a number of the racks is selected according to the magnitude of the wiring job being processed, and one or more racks loaded with a number of the boxes E according to the variety of sizes of wire required on a particular job. For example in wiring an apartment house eight sizes of electrical wires are used thus necessitating supplying the electricians with eight coils of various sized wire in their individual boxes. For this purpose it has been found good practice to provide a pair of racks each accommodating four of the boxes E with the racks superimposed and embodied in a wheeled hand-truck B as shown in FIGS. 1, 2 and 3, wherein the boxes are disposed horizontally with their upper sides opened and the wires G leading from the inner perimeter of the coils F extended through the openings H and through the guide-ways J which latter are usually arranged on one side only of the racks, but obviously may be disposed as need by on either side thereof as may be expedient.

By mounting the racks on rollers they may be readily wheeled about to position the reels convenient to the place being wired with the racks disposed so that the wires may be readily drawn from the reels by exerting a pull on the leading end portion thereof to thereby cause the spiral windings of the coil F to unwind, as shown in FIGS. 3 and 5 and as before described.

By the provision of the guide-ways J any possibility of the wires engaging and cutting into the margins of the boxes surrounding the openings H is extremely remote thus practically eliminating the loss of the electricians time and the incident expense occasioned by the necessity of freeing a wire that has become caught by cutting its way into the box top.

We claim:

1. In a holder and conveyor for a plurality of rectangular boxes each containing a coil of wire, a multiple of racks each having a support for a plurality of such boxes arranged in a row, said racks being assembled one upon another to provide a multiple of superimposed rows of such boxes, and tubular means on said racks for guiding lengths of wire outwardly from said boxes free thereof.

2. In a rack for boxed wire coils, the combination of means for supporting a box containing a coil of wire, and an open ended tubular wire guide-way carried by said means having one end thereof presented toward the top of a box on said supporting means and having its other end opening outwardly relative to said means; in which said means will support a plurality of said boxes in a row and wherein said means carries a plurality of said guide-ways whereby a guide-way is provided for each of said boxes.

3. In a rack for boxed coiled wire, the combination of elongate means for supporting in a row, a plurality of boxes each containing a roll of wire and having a discharge opening in a side thereof, supporting rollers at one end of said means, a handle-bar at the other end thereof, a series of open-ended tubular guide-ways having entrant and discharge ends, there being a guide-way provided for each of the coil-containing boxes supported on said means, and means for supporting said guide-ways on said means independent of said boxes with the entrant end of each guide-way presented toward the discharge opening in a side of a box on said supporting means with the discharge end of each guide-way opening outwardly relative to said means.

4. The structure called for in claim 3 in which the supporting means for the wire-containing boxes and the entrant ends of the guide-ways are spaced apart whereby the boxes may be freely passed between said supporting means and the entrant ends of said guide-ways.

References Cited by the Examiner
UNITED STATES PATENTS 2,828,928  4/1958  Kollisch _____ 242—137.1
3,172,617  3/1965  Johnson _____ 242—129.5

FRANK J. COHEN, *Primary Examiner.*

L. D. CHRISTIAN, *Assistant Examiner.*